United States Patent [19]
Lanter

[11] Patent Number: 6,079,282
[45] Date of Patent: Jun. 27, 2000

[54] CAPACITIVE FORCE SENSOR

[75] Inventor: Andrea Lanter, Balzers, Liechtenstein

[73] Assignee: Bossard Technologies AG, Zug, Switzerland

[21] Appl. No.: 09/165,814

[22] Filed: Oct. 2, 1998

[30] Foreign Application Priority Data

Jun. 26, 1998 [EP] European Pat. Off. .............. 98111837

[51] Int. Cl.[7] ........................................................ G01L 1/12
[52] U.S. Cl. ...................................... 73/862.626; 73/780
[58] Field of Search ...................... 73/777, 780, 862.625, 73/862.634, 862.626

[56] References Cited

U.S. PATENT DOCUMENTS

| | | | |
|---|---|---|---|
| 4,783,237 | 11/1988 | Aine et al. | 438/52 |
| 5,756,901 | 5/1998 | Kurle et al. | 73/777 |
| 5,777,226 | 7/1998 | Ip | 73/514.24 |
| 5,894,090 | 4/1999 | Tang et al. | 73/504.02 |

*Primary Examiner*—Max Noori
*Attorney, Agent, or Firm*—Merchant & Gould P.C.

[57] ABSTRACT

A force sensor, such as it can be used in a scale, consists of two glass supports with springs arranged there between. An electrode is arranged on each glass support and the capacity between the electrodes is measured. The springs are silicon single crystals, which avoids fatigue and stress and therefore provides a drift-free sensor.

18 Claims, 2 Drawing Sheets

CAPACITIVE FORCE SENSOR

CROSS REFERENCE TO RELATED APPLICATIONS

This application claims the priority of European application 98111837.5, filed Jun. 26, 1998, the disclosure of which is incorporated herein by reference in its entirety.

BACKGROUND OF THE INVENTION

The invention relates to a force sensor as it is e.g. being used in electronic scales and similar instruments. Such sensors comprise two electrodes, at least one of which is elastically mounted by a spring assembly. The spring assembly is usually made of steel or aluminum.

In order to provide sufficient reliability, such sensors have to be calibrated each time before they are used for compensating drift and fatigue. Using the sensors continuously without recalibration is not recommended.

To overcome this problem, it has been suggested in DE 3426165 to use single crystal electrode members. This solution is, however, expensive and not applicable for larger scales.

BRIEF SUMMARY OF THE INVENTION

Hence, it is a general object of the invention to provide a simple sensor with low drift and fatigue.

Now, in order to implement these and still further objects of the invention, which will become more readily apparent as the description proceeds, the force sensor is manifested by the features that it comprises first and second electrode members, each of said electrode members carrying an electrode, circuitry for determination of an electric capacity between said electrodes, and a spring assembly holding said electrode members elastically displaceable towards each other, said spring assembly comprising at least one monocrystalline spring, wherein said spring is a plate having first and second opposite sides, wherein a first side is contacting said first electrode member in at least one first area and said second side is contacting said second electrode member in at least one second area, wherein said first area is arranged in a first section of said plate and said second area is arranged in a second section of said plate.

In another aspect of the invention, the capacitive sensor comprises first and second electrode members, each of said electrode members carrying an electrode, and a spring assembly holding said electrode members elastically displaceable towards each other, said spring assembly comprising at least one monocrystalline spring, wherein said spring is a plate having first and second opposite sides, wherein a first side is contacting said first electrode member is a first area and said second side is contacting said second electrode member in a second area, wherein said second area is opposite a first gap formed between said first side and said first electrode member and wherein said first area is opposite a second gap formed between said second side and said second electrode member.

In yet another aspect of the invention, the capacitive force sensor comprises first and second electrode members, each of said electrode members comprising a support plate for an electrode, said support plate being of a material selected from the group comprising glass and ceramics, circuitry for determination of an electric capacity between said electrodes, and a spring assembly holding said electrode members elastically displaceable towards each other, said spring assembly comprising at least one monocrystalline spring connected to said support plates.

In a further aspect of the invention, the capacitive force sensor comprises first and second support plates of a material selected from the group comprising glass and ceramics, electrodes arranged on said support plates, and monocrystalline spring plates arranged between said support plates.

By using monocrystalline springs, the sensors according to the invention show much lower drift and fatigue than conventional sensors using amorphous springs. Still, the springs are comparatively small, which keeps the device inexpensive.

Using mutually offset support faces on opposite sides of the spring plates leads to a well defined deformation of the springs under pressure. If the springs have only one support face on each side, the sensor deforms in parallelogram-like manner under pressure and has a highly linear response.

Using supports of glass or ceramics further increases stability of the device because these materials show only weak mechanical drift. Each plate can carry one of the electrodes, which has e.g. been applied to it by evaporation or sputtering, or which can be a rigid metal plate.

In order to obtain well defined electrode areas, it is preferred to electrically insulate the springs from all electrodes.

A simple method to manufacture the sensor comprises the step of anode bonding the spring to a plate of glass or ceramics, which plate carries at least one of the electrodes.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
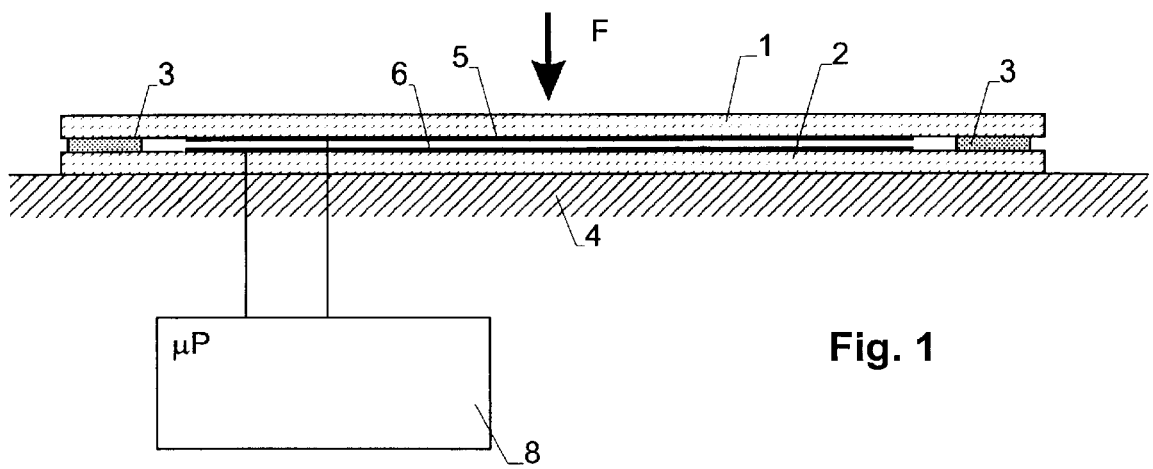
FIG. 1 is a sectional view of a preferred embodiment of the sensor.
Figure 2:
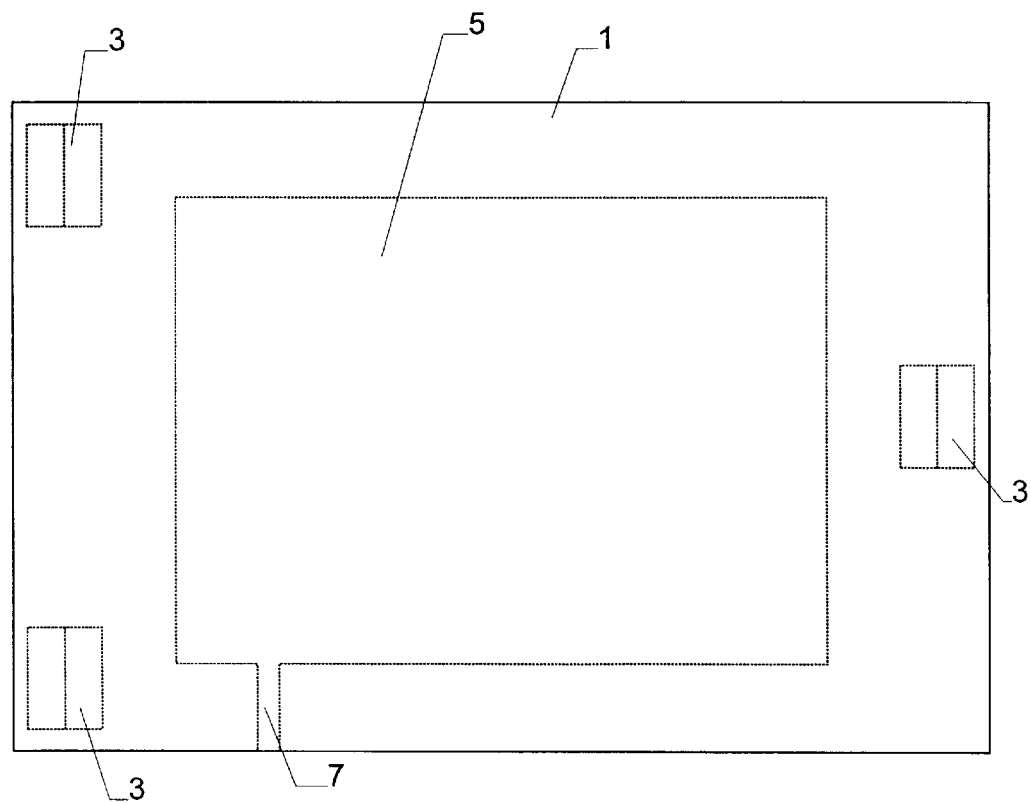
FIG. 2 is a top view of the sensor of FIG. 1.

FIGS. 1 and 2 show an embodiment of the invention as it can e.g. be used in a scale. The weight sensor comprises an upper glass support plate 1 and a lower glass support plate 2 with three springs 3 arranged between them and is resting on a support 4. An upper electrode 5 is arranged on upper glass plate 1, a lower electrode 6 on lower glass plate 2. Leads 7 are arranged on the electrodes 5, 6 for connecting them to a microprocessor controlled circuitry 8.

In other words, the weight sensor comprises two electrode members. The upper electrode member consists, in the present embodiment, of upper glass plate 1 and upper electrode 5, the lower electrode member of lower glass plate 2 and lower electrode 6. The springs 3 form a spring assembly for holding the electrode members in elastically displaceable relation.

The scale operates as follows: When applying a force F onto upper glass plate 1, the springs 3 are compressed and upper electrode 5 is brought closer to lower electrode 6, thereby increasing the capacity between the two electrodes. The circuitry 8 is adapted in known manner to measure the capacity between the electrodes 5, 6 and to calculate force F therefrom. The result can e.g. be displayed on a suitable LCD display or transferred to a host computer over a dedicated interface.

Figure 3:
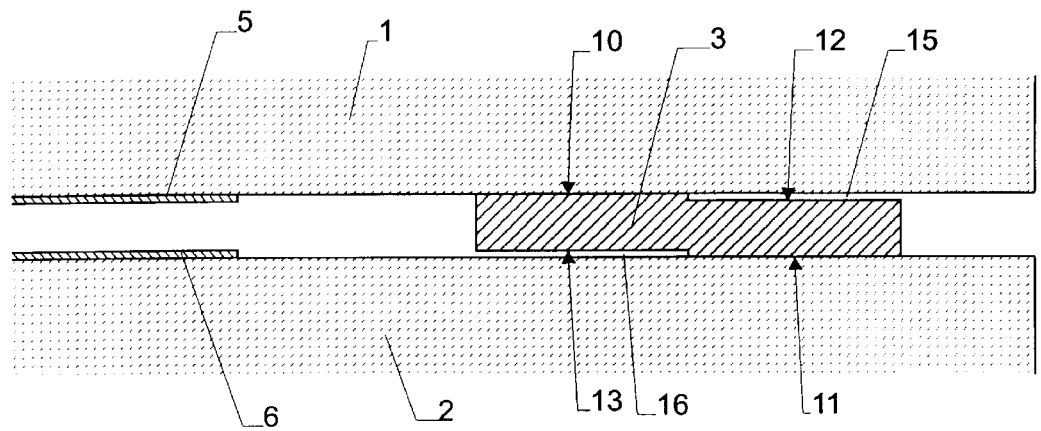
FIG. 3 is an enlarged sectional view of a first embodiment of a single crystalline spring.

FIG. 3 shows a detailed view of the design of one spring 3. Spring 3 is made from a silicon single crystal plate. When seen from above (FIG. 2), it is substantially rectangular. In the present embodiment it covers an area of approximately 1 cm² and its thickness is approximately 0.5 mm.

The upper and lower sides of the spring each are divided into a flat support face 10, 11 and a recessed area 12, 13. Upper support face 10 is arranged opposite to lower recessed area 13 and upper recessed area 12 is arranged opposite to lower support face 11. Upper support face 10 is bonded to upper glass plate 1 and lower support face 11 can be bonded to lower glass plate 2. This geometry defines upper and lower gaps 15, 16 between spring 3 and glass plates 1, 2. Upper gap 15 is adjacent to upper support face 10, lower gap 16 is adjacent to lower support face 11, while upper gap 15 is opposite lower support face 11 and lower gap 16 is opposite upper support face 10.

In other words, a first end section of spring 3 is connected to upper glass plate 1, a second end section to lower glass plate 2. Upper support face 10 is arranged in the first end section (left hand section in FIG. 3), lower support face 11 is arranged in the second end section (right hand section in FIG. 3).

All springs 3 are designed in the same manner and arranged in the same orientation.

Figure 4:
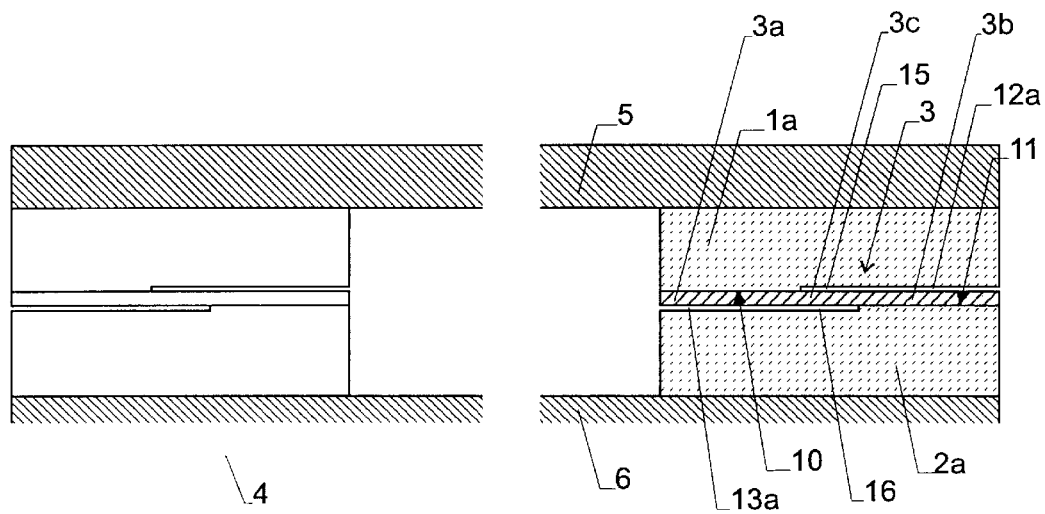
FIG. 4 is a second embodiment of the invention.

FIG. 4 shows an alternative embodiment of the invention. Here, glass supports 1 and 2 each consist of three individual slabs 1a, 2a arranged adjacent to three springs 3. The electrodes 5, 6 are rigid, self supporting metal plates. Upper electrode 5 rests on the upper glass slabs 1a, lower electrode 6 supports the lower glass slabs 2a.

In this embodiment, each single crystal spring 3 is a flat plate. It contacts upper glass slab 1a in an upper support face 10 and lower glass slab 2a in a lower support face 11. The upper and lower glass slabs 1a, 2a are provided with recessed areas 12a, 13a to form upper and lower gaps 15, 16 between the glass slabs and the spring.

Upper gap 15 is adjacent to upper support face 10, lower gap 16 is adjacent to lower support face 11 while upper gap 15 is opposite lower support face 11 and lower gap 16 is opposite upper support face 10.

Hence, as above, a first end section 3a of spring 3 is bonded to upper glass slab 1a, a second end section 3b of spring 3 is bonded to lower glass slab 2a. Between first end section 3a and second end section 3b there is an middle section 3c that is neither bonded to the upper nor the lower electrode member and makes the spring response more linear and softer.

When applying a force F to the upper electrode member of one of the shown embodiments, the springs 3 are deformed. However, since they are made of single crystal material, no mechanical fatigue occurs and, when force F is released, they return to their original position.

Since all springs are arranged in the same orientation and move in parallelogram-like fashion under pressure, the distance between the electrodes is a highly linear function of the applied force.

Glass (such as Pyrex) or, alternatively, ceramics is used for plates 1, 2 and glass slabs 1a, 2a because of the hardness of these materials and their low tendency to bend under stress and because they are good electrical insulators. Even though the springs 3 may be connected to one of the electrodes, it is preferred to isolate them from both electrodes in order to obtain a better defined electrode geometry.

The sensor shown in the figures can be manufactured as follows:

For the embodiment of FIG. 3, the springs 3 are shaped from single crystal silicon slabs by etching off the recessed areas 12, 13 to a depth of approximately 100 μm. Then, the electrodes 5, 6 are evaporated onto the glass plates 1, 2. Other suited methods for applying the electrodes are e.g. sputtering or suited printing techniques. Finally, anodic bonding is used to attach the springs 3 to one or both glass plates 1, 2. Instead of anodic bonding, eutectic bonding can be used as well. Anodic bonding, however, is preferred because it combines low cost and high mechanical stability.

To manufacture the embodiment of FIG. 4, the glass slabs 1a, 1b are prepared from etched glass platelets. Again, anodic bonding is used for connecting the glass slabs to the springs.

The sensor shown in FIGS. 1–4 is only one of the possible embodiments of the invention. The dimensions and shape of the components used in the device can be varied.

In the shown embodiments, three springs 3 have been arranged around the electrodes. It has been found that this arrangement provides the best performance because force F is substantially evenly distributed over all three electrodes. It is, however, also possible to replace one or two of the electrodes by rigid spacers such that upper plate 1 is tilted instead of lowered in parallel manner when applying a force F. More than three springs can be used as well.

The springs can also be made from other single crystal materials, but silicon is preferred for its low cost and wide availability.

In the embodiment of FIG. 3, the springs 3 have been etched to provide recessed areas 12, 13 and to form corresponding gaps for allowing a movement of the springs. Alternatively, recessed areas can be prepared by etching the glass plates 1 and/or 2 (as shown in FIG. 4), or spacers can located between the springs and the glass plates.

Instead of using glass plates extending over the whole area as in the device of FIG. 3, smaller glass or ceramic slabs can be arranged above and/or below each spring 3 such as shown in FIG. 4. These glass slabs can then be bonded to a suitable electrode support or the electrodes themselves. Care must be taken, however, to make sure that the used bonding techniques are not prone to fatigue or drift phenomena.

Figure 5:
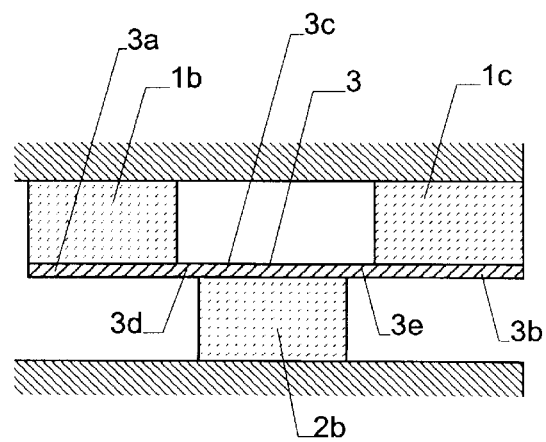
FIG. 5 is a third embodiment of the invention.

FIG. 5 shows an embodiment where each spring 3 is arranged between two upper glass spacers 1b, 1c and one lower glass spacer 2b. Glass spacers 1b, 1c contact spring 3 in its end sections 3a, 3b, glass spacer 2b contacts spring 3 in a middle section 3c. Free sections 3d, 3e are arranged between the end sections and the middle section where spring 3 is connected to neither electrode member. The arrangement of FIG. 5 can be extended to a larger number of glass spaces above and below spring 3.

The embodiments shown in FIGS. 3 and 4 comprise inherent overload protection if dimensoned properly: As pressure increases, the gaps between spring and glass plates will narrow until the spring abuts against the glass plates.

While there are shown and described presently preferred embodiments of the invention, it is to be distinctly understood that the invention is not limited thereto but may be otherwise variously embodied and practiced within the scope of the following claims.

What is claimed is:

1. A capacitive force sensor comprising:

first and second electrode members, each of said electrode members carrying an electrode, circuitry for determination of an electric capacity between said electrodes, and a spring assembly holding said electrode members elastically displaceable towards each other, said spring assembly comprising at least one monocrystalline spring, wherein said spring comprises first and second flat support faces on opposite sides and contacting said first and second electrode members, wherein first and second gaps are defined between said spring and said first and second electrode members, each of said gaps being adjacent to one of said support faces, and wherein said first support face is arranged opposite to said second gap and said second support face is arranged opposite to said first gap.

2. The force sensor of claim 1, wherein at least one of said electrode members comprises a support for said electrode consisting of a material selected from the group comprising glass and ceramics, and wherein said at least one spring is bonded to said support.

3. The force sensor of claim 1, wherein both said electrode members comprise each a support for said electrodes consisting of a material selected from the group comprising glass and ceramics, and wherein said at least one spring is bonded to both said supports.

4. The force sensor of claim 1 wherein said at least one spring comprises a first recessed area arranged adjacent to said first support face and a second recessed area arranged adjacent to said second support face, and wherein said first and second gaps are formed between said first and second recessed areas and said first and second electrode members.

5. The force sensor of claim 1 wherein said electrode members comprise recesses forming said gaps.

6. The force sensor of claim 1 wherein said at least one spring is a flat plate.

7. The force sensor of claim 1 comprising a plurality of said springs, wherein all said springs are arranged in equal orientation.

8. The force sensor of claim 1 comprising a plurality of said springs, wherein said springs are arranged around said electrodes.

9. The force sensor of claim 1 wherein said at least one spring is electrically insulated from said electrodes.

10. The force sensor of claim 1 wherein said at least one spring is a single crystal silicon plate.

11. The force sensor of claim 1 wherein said at least one spring comprises exactly two support faces, wherein one support face is arranged on each side of said spring.

12. The force sensor of claim 1 comprising at least three support faces, wherein at least two support faces are arranged on the same side of said spring.

13. A capacitive force sensor comprising:

first and second electrode members, each of said electrode members carrying an electrode, and a spring assembly holding said electrode members elastically displaceable towards each other, said spring assembly comprising at least one monocrystalline spring, wherein said spring is a plate having first and second opposite sides and being divided, along dividing planes perpendicular to said sides, into a plurality of sections, wherein said first side is contacting said first electrode member in at least one first area and said second side is contacting said second electrode member in at least one second area, wherein said first area is arranged in a first said section of said plate and said second area is arranged in a second said section of said plate.

14. The capacitive force sensor of claim 13 wherein said first and second sections are arranged at opposite ends of said plate.

15. The capacitive force sensor of claim 13 wherein said plate further comprises an intermediate section arranged between said first and second sections, said intermediate section being neither connected to said first nor said second electrode member.

16. A capacitive force sensor comprising:

first and second electrode members, each of said electrode members comprising a support for an electrode, said support being of a material selected from the group comprising glass and ceramics, circuitry for determination of an electric capacity between said electrodes, and a spring assembly holding said electrode members elastically displaceable towards each other, said spring assembly comprising at least one monocrystalline spring connected to said supports.

17. A capacitive force sensor comprising:

first and second supports of a material selected from the group comprising glass and ceramics, electrodes connected to said supports, and monocrystalline spring plates arranged between said supports.

18. A capacitive force sensor comprising:

first and second electrode members, each of said electrode members carrying an electrode;

a spring assembly holding said first and second electrode members apart from each other, said spring assembly comprising at least one elastically displaceable monocrystalline spring; and wherein said spring is a plate having first and second sides, said first side including a first section contacting said first electrode member and a second section spaced from said first electrode member, and said second side including a first section contacting said second electrode member and a second section spaced from said second electrode member.

* * * * *